US006961785B1

(12) United States Patent
Arndt et al.

(10) Patent No.: US 6,961,785 B1
(45) Date of Patent: Nov. 1, 2005

(54) PERMANENT OPEN FIRMWARE PCI HOST BRIDGE (PHB) UNIT ADDRESSING TO SUPPORT DYNAMIC MEMORY MAPPING AND SWAPPING OF I/O DRAWERS

(75) Inventors: Richard Louis Arndt, Austin, TX (US); Tam D. Bui, Austin, TX (US); Van Hoa Lee, Cedar Park, TX (US); David Lee Randall, Leander, TX (US); Kiet Anh Tran, Cedar Park, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 09/631,723

(22) Filed: Aug. 3, 2000

(51) Int. Cl.[7] .......................... G06F 3/00; G06F 13/00

(52) U.S. Cl. .......................... 710/9; 710/104; 710/302; 713/1

(58) Field of Search .............................. 710/9, 10, 302; 707/9, 200; 709/321; 713/1, 300; 714/25

(56) References Cited

U.S. PATENT DOCUMENTS 5,809,331 A * 9/1998 Staats et al. .................. 710/10
5,884,322 A * 3/1999 Sidhu et al. ................ 707/200
5,935,252 A * 8/1999 Berglund et al. ........... 713/300
6,041,364 A * 3/2000 Lortz et al. ................. 709/321
6,044,411 A * 3/2000 Berglund et al. .............. 710/9
6,148,419 A * 11/2000 Ahrens et al. ................ 714/25
6,230,265 B1 * 5/2001 Ahrens et al. ................. 713/1
6,243,774 B1 * 6/2001 Eide et al. .................. 710/302
6,282,674 B1 * 8/2001 Patel et al. ................... 714/30
6,438,624 B1 * 8/2002 Ku et al. ....................... 710/9

* cited by examiner

*Primary Examiner*—Glenn A. Auve
*Assistant Examiner*—Christopher E. Lee
(74) *Attorney, Agent, or Firm*—Duke W. Yee; Mark E. McBurney; Wayne P. Bailey

(57) ABSTRACT

A system for managing input/output drawers within a data processing system. A unique identifier is assigned to each of a plurality of drawers, and is used by the operating system to identify the drawers in the system regardless of how these drawers are interconnected. Another unique PCI-bridge identifier is assigned to each of a plurality of PCI Host bridges (PHBs) from all drawers, and is used by the operating system to perform input/output processes to devices associated with the plurality of PHBs such that the ODM object for each of the PHBs remains the same regardless of how the drawer is interconnected in the system. When a new drawer is added to the system, a new unique identifier is assigned to the new drawer ensuring that the unique identifiers previously assigned to the other drawers are not used to identify the new drawer.

21 Claims, 3 Drawing Sheets

BEGIN
502 DISCOVER DRAWERS
504 ASSIGN MEMORY MAPPING TO THE DRAWER AND ITS PHBs
506 CREATE PHB NODES
508 CREATE LOCATION CODES FOR THE PHB NODES
510 UPDATE OPEN FIRMWARE DEVICE TREE IN SYSTEM MEMORY
END

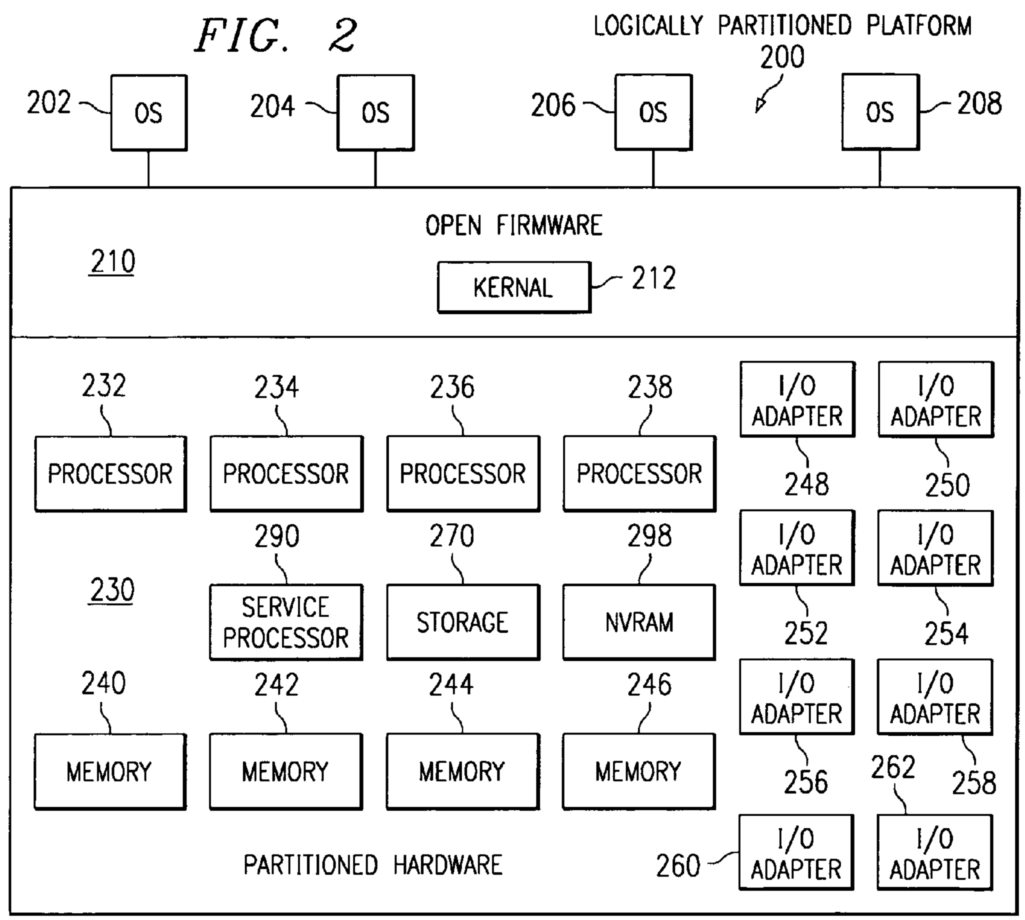
FIG. 2
LOGICALLY PARTITIONED PLATFORM
200
202
OS
204
OS
206
OS
OS
208
OPEN FIRMWARE
210
KERNAL
212
232
234
236
238
PROCESSOR
PROCESSOR
PROCESSOR
PROCESSOR
I/O ADAPTER
I/O ADAPTER
248
250
290
270
298
230
SERVICE PROCESSOR
STORAGE
NVRAM
I/O ADAPTER
I/O ADAPTER
252
254
240
242
244
246
I/O ADAPTER
I/O ADAPTER
MEMORY
MEMORY
MEMORY
MEMORY
256
262
258
PARTITIONED HARDWARE
260
I/O ADAPTER
I/O ADAPTER

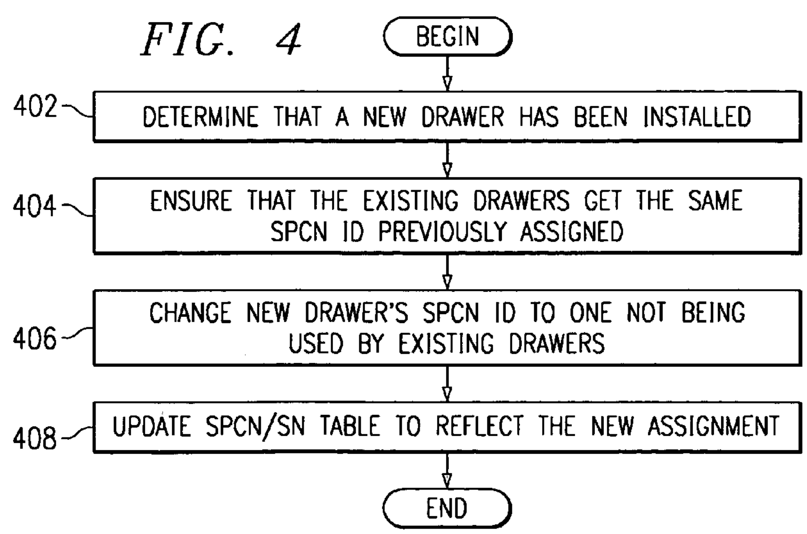
FIG. 4
BEGIN
402
DETERMINE THAT A NEW DRAWER HAS BEEN INSTALLED
404
ENSURE THAT THE EXISTING DRAWERS GET THE SAME SPCN ID PREVIOUSLY ASSIGNED
406
CHANGE NEW DRAWER'S SPCN ID TO ONE NOT BEING USED BY EXISTING DRAWERS
408
UPDATE SPCN/SN TABLE TO REFLECT THE NEW ASSIGNMENT
END SYSTEM 300
310
312
PHB
PHB
I/O DRAWER
304
302
SERVICE PROCESSOR
SPCN BUS
380
314
316
PHB
PHB
I/O DRAWER
306
340
342
OPEN FIRMWARE DEVICE TREE
SYSTEM MEMORY
318
320
PHB
PHB
I/O DRAWER
308
SPCN/SN TABLE
324
NVRAM
322
FIRMWARE
326

BEGIN
502
DISCOVER DRAWERS
504
ASSIGN MEMORY MAPPING TO THE DRAWER AND ITS PHBs
506
CREATE PHB NODES
508
CREATE LOCATION CODES FOR THE PHB NODES
510
UPDATE OPEN FIRMWARE DEVICE TREE IN SYSTEM MEMORY
END

PERMANENT OPEN FIRMWARE PCI HOST BRIDGE (PHB) UNIT ADDRESSING TO SUPPORT DYNAMIC MEMORY MAPPING AND SWAPPING OF I/O DRAWERS

BACKGROUND OF THE INVENTION

1. Technical Field

The present invention relates generally to the field of computer software and, more specifically, to a method, system, and apparatus for managing addressing to input/output drawers.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

In many systems, I/O devices are incorporated into the data processing system using I/O drawers. These I/O drawers are modular structures that are easy to install and remove allowing for each modification of the data processing system. The I/O drawers typically contain several I/O expansion slots in which I/O devices may be "plugged" into and used by the data processing system. For example, many I/O drawers allow for 8 or 16 I/O expansion slots.

Each I/O drawer and expansion slot within the I/O drawer must be assigned addresses by the data processing system such that input and output requests from various components within the system may utilize the new hardware. In prior art RIO systems, open firmware peripheral component interconnect (PCI) Host Bridge (PHB) unit addresses are dynamically generated based on dynamic discovery of PHBs on successive Remote Input/Output (RIO) loop probes. A RIO system employs a special I/O bridge, which is called an RIO hub and has several ports to connect to I/O drawers via special high-speed cables. An I/O drawer has two ports. There are two typical RIO loops: 1) one port of a hub connected to the input port of an I/O drawer, and the output port of this I/O drawer connected to the companion port of the same hub; 2) one port of a hub connected to the input port of an I/O drawer, the output port of this I/O drawer connected to the input port of another I/O drawer, and the output port of the other I/O drawer connected to the companion port of the same hub. An RIO loop probe refers to the discovery process to determine the presence of one of these two RIO loops. The ODM of some operating systems, such as, for example. Advanced Interactive Executive (AIX) operating system, use the open firmware device path (e.g. /pci@fba0000000/scsi) as the identifier of an Object Database Management (ODM) object. ODM is a software component of AIX. Hardware functional components such as PCI Host Bridges (PHBs) are represented as ODM objects in the database to be managed by the ODM software. If a user moves an RIO drawer from one RIO loop to another, all open firmware PHB unit addresses change. The AIX ODM then presents the user with questions regarding the disappearance of the associated resources for the "old" drawer and the appearance of resources associated with a "new" drawer, when, from the user's point of view, all of the same resources are still being employed. Currently, the user must manually resolve the AIX ODM when the drawer is moved to a different location within the same data processing system.

Such occurrences can be confusing and annoying to users, therefore, a data processing system in which I/O drawers may be inserted, removed, and rearranged without requiring a user to resolve any address problems would be desirable.

SUMMARY OF THE INVENTION

The present invention provides a method, system, and apparatus for managing input/output drawers within a data processing system. In one embodiment, a unique location identifier is assigned to each of a plurality of input/output drawers. The unique location identifier is stored in memory and is used by the operating system to identify the plurality of input/output drawers regardless of how the input/output drawers are interconnected by cables. When a new input/output drawer is added to the data processing system, the service processor assigns a new unique location identifier to the new input/output drawer ensuring that the unique location identifiers previously assigned to other I/O drawers are not used to identify the new I/O drawer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a block diagram of an exemplary logically partitioned platform in which the present invention may be implemented;

FIG. 4 depicts a flowchart illustrating an exemplary process for incorporating a new I/O drawer into a data processing system in accordance with the present invention.

DETAILED DESCRIPTION OF THE PREFERRED EMBODIMENT

Figure 1:
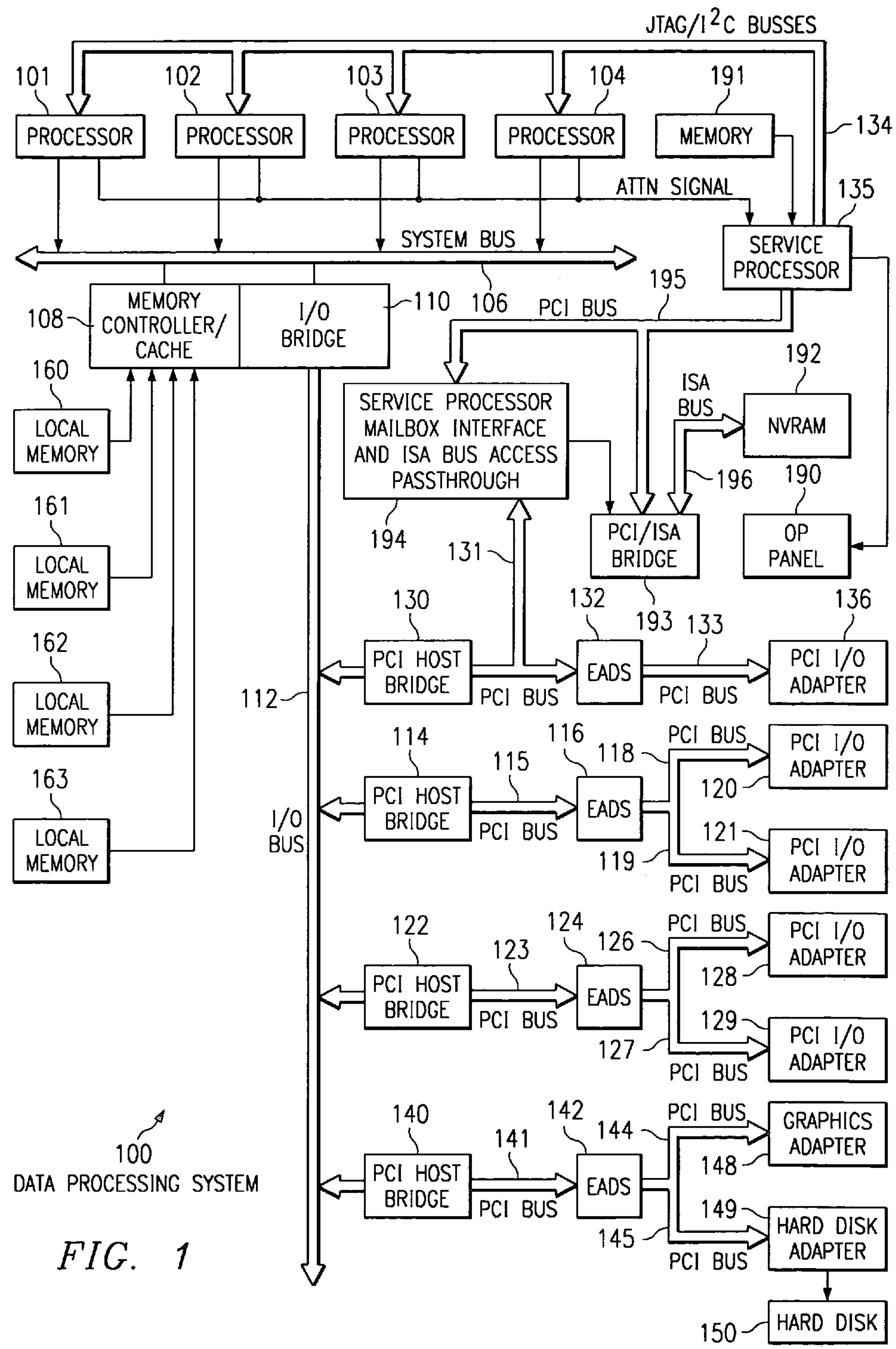
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P3. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115 by a PCI bus 118 and 119 and EADS (PCI—PCI bridge) 116. Typical PCI bus implementations will support between four and eight I/O adapters (i.e. expansion slots for add-in connectors). Each I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129 by a PCI bus 126–127 and EADS 124. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132, which is coupled to PCI I/O adapter 136 through PCI bus 133. The ISA bus access pass-through logic 194 forwards PCI accesses destined to the PCI/ISA bridge 193. The NV-RAM storage 192 is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware (OF) 210 including Kernal 212, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 232–238, memory units 240–246, NV-RAM storage 298, and I/O adapters 248–262 may be assigned to one of the multiple partitions within logically partitioned platform 200, each of which corresponds to one of operating systems 202–208.

OF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

OF 210 is a firmware implemented virtual machine identical to the underlying hardware. Thus, OF 210 allows the simultaneous execution of independent OS images 202–208 by virtualizing all the hardware resources of logically partitioned platform 200. OF 210 may attach I/O devices through I/O adapters 248–262 to single virtual machines in an exclusive mode for use by one of OS images 202–208.

Figure 3:
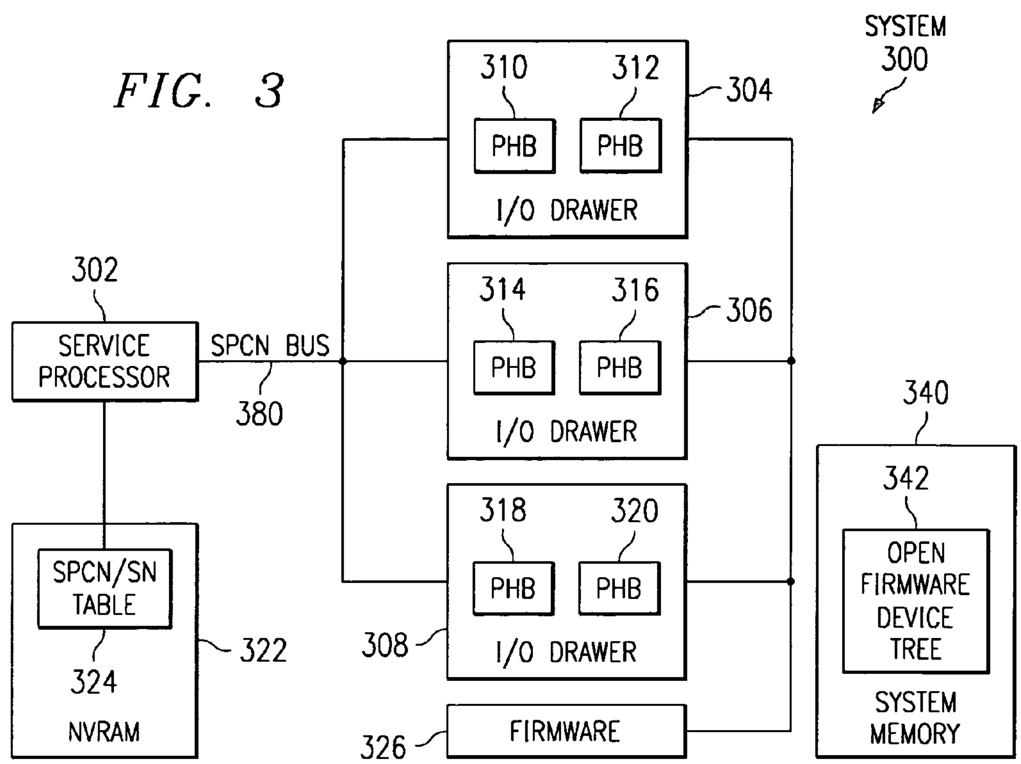
FIG. 3 depicts a block diagram of a system for installing and managing a system I/O drawers in accordance with the present invention.

With reference now to FIG. 3, a block diagram of a system for installing and managing a system I/O drawers is depicted in accordance with the present invention. System 300 may be implemented within a data processing system such as, for example, logically partitioned platform 200 in FIG. 2. A system I/O drawer is a modular component for inserting I/O expansion slots into a data processing system. An I/O drawer physically packages several PHBs to provide PCI I/O slots for plug-in I/O adapters. In FIG. 1, everything attached to I/O bus 112 could reside in an I/O drawer, including the service processor 135. The I/O bus 112 is a special high-speed cable connecting the I/O bridge 110, which is called a hub, to the I/O drawer's input/output ports. The I/O drawer containing the service processor 135 is called the primary drawer. All other I/O drawers are connected via the System Power Control Network (SPCN) bus 380 to the service processor 135.

System 300 includes three I/O drawers 304–308. Each of I/O drawers 304–308 contains two PCI host bridges (PHBs) 310–320. However, although depicted with three I/O drawers 304–308 and two PHBs 310–320, one skilled in the art will recognize that more or fewer I/O drawers and PHBs may be included than depicted in FIG. 3. Each PHB 310–320 may support, for example, between 8 and 16 PCI expansion slots, which may be implemented, for example, as I/O adapters 248–262 in FIG. 2.

Service processor 302, which may be implemented, for example, as service processor 290 in FIG. 2, assigns a unique SPCN ID to each of I/O drawers 304–308 within the system 300. Service processor uses the SPCN bus to detect and assign unique IDs to I/O drawers, to control the power logic of the I/O drawers, and to monitor their environmental sensors such as drawer temperature, fan speed, etc. The SPCN ID is then associated with the drawer's unique serial number from the drawer's Vital Product Data (VPD). The VPD contains information related to the product in which it is found such as, for example, product manufacturer, product serial number, and part number. When a new drawer is added to system 300, service processor 302 changes the SPCN ID of the new drawer to a value not being used by any of the existing I/O drawers 304–308. An SPCN/SN table 324 within NVRAM 322 is updated by service processor 302 to reflect the new assignment of the SPCN ID. NVRAM 322 may be implemented as, for example, NVRAM 298 in FIG. 2. The SPCN/SN table 324 is used in determining if a new I/O drawer is installed since the new I/O drawer's serial number is not in the existing table. From the SPCN/SN table 324, the service processor 302 can find out all SPCN Ids currently used by the existing I/O drawers 304–308 so that it can select an unused SPCN ID for the new drawer. The SPCN ID can be used to label an I/O drawer by displaying its SPCN ID to the I/O drawer LCD operator panel.

System firmware 326, which may be implemented as open firmware 210 in FIG. 2, dynamically discovers the I/O drawers 304–308 and assigned memory mapping to each one of drawers 304–308 and its PHBs 310–320. The location code for the drawer, in one embodiment, is U0.X where X is the SPCN ID of the drawer 304–308. Firmware 326 also creates PHB nodes with the "reg" property. The "reg" property is an open firmware device node property that indicates the unit address of the PHB device with respect to the address space of the parent device node, which is the system root node. In one embodiment, the PHB nodes have the following form: MMMPSSSS SSSSSSSS, wherein MMM is the RIO drawer type. For example, MMM= 0×800 for Outlaw drawer and 0×400 for Outlaw-X drawer. P is the PHB number within the drawer, i.e. 0, 1, or 2. SSSS SSSSSSSS is the low order six bytes of the drawer's VPD Serial Number (SN) keyword data. VPD SN keyword data is the content of the SN field within the Vital Product Data.

Firmware 326 also creates location codes for PHB nodes as, for example, U0.X-P1 where X is the SPCN ID of the drawer. The device nodes and location codes are stored in open firmware (OF) device tree 342 within system memory 340. System memory 340 may be implemented as, for example, memory 191 in FIG. 1. The PHB nodes are parts of the open firmware device tree 342 constructed by open firmware in system memory 340. Since the serial number and SPCN ID are permanently associated and maintained by service processor 302, the ODM of the OS, such as, for example, one of OSs 202–208, will be unchanged for the drawer. AIX Object Database Management (ODM) software allows users to query and manage system configuration.

If one of I/O drawers 304–308 is removed from system 300 and used in another data processing system, the SPCN of the I/O drawer may be reprogrammed by the new system such that a new SN/SPCN association is established for the ODM of the OS on the new system. If the operator panel FRU of the I/O drawer where the VPD is kept is replaced during servicing, the socketed VPD module may be retained and used in the new operator panel so that the service action does not affect the operating systems ODM. If one of the I/O drawers 304–308 is moved to a different physical location within system 300, no action on the part of the user is required. This movement of drawers is transparent to the customer. Thus, OF PHB unit addresses (used as operating system ODM "handles", which is a key to be used in the ODM database search) are permanent for a given RIO drawer even if the drawer is moved to a new RIO loop and given a new memory mapping. Consequently, the AIX ODM object for the drawer is the same regardless of location. The PHB unit address is the "reg" property of the PHB device node in the OF device tree.

Those of ordinary skill in the art will appreciate that the components depicted in FIG. 3 may vary. For example, other I/O adapters may be utilized rather than PCI type adapters. The depicted example is not meant to imply architectural limitations with respect to the present invention.

With reference now to FIG. 4, a flowchart illustrating an exemplary process for incorporating a new I/O drawer into a data processing system is depicted in accordance with the present invention. After a new I/O drawer, such as, for example, one of I/O drawers 304–308 is inserted into a data processing system, the service processor recognizes that a new drawer has been installed (step 402). The service processor then consults an SPCN/SN table of assignments of SPCN IDs to existing I/O drawers to ensure that the new I/O drawer is not assigned an SPCN previously assigned to another I/O drawer (step 404). The service processor then changes the new I/O drawer's SPCN ID to one not being used by one of the existing I/O drawers (step 406). The SPCN/SN table is then updated to reflect the new assignment (step 408).

Figure 5:
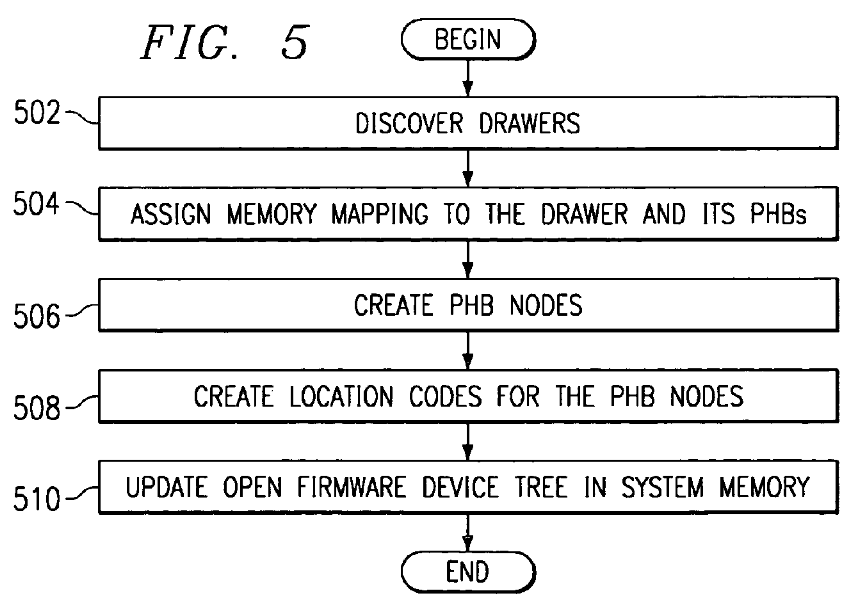
FIG. 5 depicts a flowchart illustrating an exemplary process for assigning memory mapping to I/O drawers in accordance with the present invention.

With reference now to FIG. 5, a flowchart illustrating an exemplary process for assigning memory mapping to I/O drawers is depicted in accordance with the present invention. As I/O drawers, such as, for example, one of I/O drawers 304–308 in FIG. 3, are added to a data processing system, the system firmware, such as, for example, firmware 326 in FIG. 3, discovers the I/O drawers (step 502). The firmware then assigns memory mapping to the I/O drawer and each of its associated PHBs (step 504). Memory mapping to an I/O drawer as used herein means assigning system memory address ranges so that these addresses can be used by the host processors to access I/O devices within the drawer. SPCN ID is not involved in the memory mapping process. SPCN ID is used by open firmware to generate PHB location codes for the PHB nodes in the device tree. The firmware then creates PHB nodes (step 506) and location codes for the PHB nodes (step 508) and stores this information in the open firmware device tree (step 510) located in system memory, such as, for example, system memory 340 in FIG. 3. Each PHB node's "reg" property is the PHB's unit address. PHB nodes are device representation of the PHB hardware in the open firmware device tree. The nodes contain the open firmware device properties which describe the characteristics of the PHBs and the memory mapping of the PHBs, and open firmware methods which are software device driver function for the PHBs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing input/output drawers within a data processing system, the method comprising:

assigning a unique identifier to each of a plurality of input/output drawers; and storing the unique identifier in memory;

wherein the unique identifier is used by an operating system to identify the plurality of input/output drawers regardless of how the input/output drawers are interconnected by cables, such that physical addresses used when accessing devices contained within said plurality of input/output drawers do not change when reconfiguring at least one of said plurality of input/output drawers within the data processing system by physical insertion, physical removal or physical rearrangement, wherein the physical addresses that do not change include physical addresses used when accessing devices contained within the reconfigured drawer(s).

2. The method as recited in claim 1, further comprising:

responsive to a determination that a new input/output drawer has been added to the data processing system, assigning a new unique identifier to the new input/output drawer, wherein the new unique identifier is different from any of the unique identifiers previously assigned, such that each of the plurality of input/output drawers maintains the same unique identifier.

3. The method as recited in claim 2, wherein the unique identifier and the new unique identifier are stored in a device tree.

4. The method as recited in claim 3, wherein the device tree is stored in a system memory.

5. The method as recited in claim 2, wherein the unique identifier comprise device nodes and location codes.

6. The method as recited in claim 2, further comprising:

updating a device tree to reflect a configuration of the data processing system after inclusion of the new input/output drawer.

7. The method as recited in claim 1, wherein the method is performed in a service processor.

8. A computer program product in a computer readable media for use in a data processing system for managing input/output drawers within the data processing system, the computer program product comprising:

first instructions for assigning a unique identifier to each of a plurality of input/output drawers; and second instructions for storing the unique identifier in memory;

wherein the unique identifier is used by an operating system to identify the plurality of input/output drawers regardless of how the input/output drawers are interconnected by cables, such that physical addresses used when accessing devices contained within said plurality of input/output drawers do not change when reconfiguring at least one of said plurality of input/output drawers within the data processing system by physical insertion, physical removal or physical rearrangement, wherein the physical addresses that do not change include physical addresses used when accessing devices contained within the reconfigured drawer(s).

9. The computer program product as recited in claim 8, further comprising:

third instructions, responsive to a determination that a new input/output drawer has been added to the data processing system, for assigning a new unique identifier to the new input/output drawer, wherein the new unique identifier is different from any of the unique identifiers previously assigned, such that each of the plurality of input/output drawers maintains the same unique identifier.

10. The computer program product as recited in claim 9, wherein the unique identifier and the new unique identifier are stored in a device tree.

11. The computer program product as recited in claim 10, wherein the device tree is stored in a system memory.

12. The computer program product as recited in claim 9, wherein the unique identifier comprise device nodes and location codes.

13. The computer program product as recited in claim 9, further comprising:

fourth instructions for updating a device tree to reflect a configuration of the data processing system after inclusion of the new input/output drawer.

14. The computer program product as recited in claim 8, wherein said first and second instructions are executed in a service processor.

15. A system for managing input/output drawers within a data processing system, the system comprising:

first means for assigning a unique identifier to each of a plurality of input/output drawers; and second means for storing the unique identifier in memory; wherein the unique identifier is used by an operating system to identify the plurality of input/output drawers regardless of how the input/output drawers are interconnected by cables, such that physical addresses used when accessing devices contained within said plurality of input/output drawers do not change when reconfiguring at least one of said plurality of input/output drawers within the data processing system by physical insertion, physical removal or physical rearrangement, wherein the physical addresses that do not change include physical addresses used when accessing devices contained within the reconfigured drawer(s).

16. The system as recited in claim 15, further comprising:

third means, responsive to a determination that a new input/output drawer has been added to the data processing system, for assigning a new unique identifier to the new input/output drawer, wherein the new unique identifier is different from any of the unique identifiers previously assigned, such that each of the plurality of input/output drawers maintains the same unique identifier.

17. The system as recited in claim 16, wherein the unique identifier and the new unique identifier are stored in a device tree.

18. The system as recited in claim 17, wherein the device tree is stored in a system memory.

19. The system as recited in claim 16, wherein the unique identifier comprise device nodes and location codes.

20. The system as recited in claim 16, further comprising:

fourth means for updating a device tree to reflect a configuration of the data processing system after inclusion of the new input/output drawer.

21. The system as recited in claim 15, wherein said first and second means are executed in a service processor.

* * * * *